US012536669B2

United States Patent
Li et al.

(10) Patent No.: US 12,536,669 B2
(45) Date of Patent: Jan. 27, 2026

(54) MATTING NETWORK TRAINING METHOD AND MATTING METHOD

(71) Applicants: ORBBEC INC., Guangdong (CN); SHENZHEN AOXIN MICRO VISION TECHNOLOGY CO., LTD., Guangdong (CN)

(72) Inventors: Miao Li, Shenzhen (CN); Feiyu Yang, Shenzhen (CN); Beibei Qian, Shenzhen (CN); Fei Wang, Shenzhen (CN)

(73) Assignees: Orbbec Inc., Shenzhen (CN); Shenzhen Aoxin Micro Vision Technology Co., Ltd., Shenzhen (CN)

( * ) Notice: Subject to any disclaimer, the term of this patent is extended or adjusted under 35 U.S.C. 154(b) by 306 days.

(21) Appl. No.: 18/375,264

(22) Filed: Sep. 29, 2023

(65) Prior Publication Data

US 2024/0029272 A1    Jan. 25, 2024

Related U.S. Application Data

(63) Continuation of application No. PCT/CN2021/130122, filed on Nov. 11, 2021.

(30) Foreign Application Priority Data

Aug. 9, 2021   (CN) .......................... 202110910316.4

(51) Int. Cl.
   G06T 7/194    (2017.01)
   G06T 7/11     (2017.01)
   G06T 7/174    (2017.01)

(52) U.S. Cl.
   CPC ............... *G06T 7/194* (2017.01); *G06T 7/11* (2017.01); *G06T 7/174* (2017.01); *G06T 2207/20084* (2013.01)

(58) Field of Classification Search
   CPC ..... G06T 7/10; G06T 7/11; G06T 7/12; G06T 7/174; G06T 7/194; G06T 2207/20081; G06T 2207/20084; G06N 3/02–0985
   See application file for complete search history.

(56) References Cited

U.S. PATENT DOCUMENTS

| 2020/0175700 | A1  | 6/2020 | Zhang et al. |
| 2021/0216806 | A1* | 7/2021 | Yang ............... G06V 10/454 |
| 2022/0262009 | A1* | 8/2022 | Yu .................... G06T 5/92 |

FOREIGN PATENT DOCUMENTS

| CN | 109712145 A | 5/2019 |
| CN | 111223106 A | 6/2020 |

(Continued)

OTHER PUBLICATIONS

Aksoy, Yağız, et al. "Semantic soft segmentation." ACM Transactions on Graphics (TOG) 37.4 (2018): 1-13. (Year: 2018).*

(Continued)

*Primary Examiner* — Geoffrey E Summers
(74) *Attorney, Agent, or Firm* — Sheppard Mullin Richter & Hampton LLP

(57) ABSTRACT

A method includes: obtaining a first image including a foreground, a second image including a background, and soft segmentation of the foreground; and inputting the first image, the second image, and the soft segmentation into an image matting network, and outputting a foreground segmentation of the first image. The image matting network includes at least one stage network that includes a context combining module, a stem block, and a predictor module. The first image, the second image, and the soft segmentation of the foreground are inputted into the context combining module, the context combining module is configured to output a low-order feature and a high-order feature after feature exchange, the stem block is configured to fuse the low-order feature and the high-order feature based on an (Continued)

attention mechanism to obtain a fused feature, and the predictor module is configured to output the foreground segmentation according to the fused feature.

20 Claims, 5 Drawing Sheets

(56) References Cited

FOREIGN PATENT DOCUMENTS

| | | |
|---|---|---|
| CN | 112446380 A | 3/2021 |
| CN | 113052868 A | 6/2021 |

OTHER PUBLICATIONS

Sengupta, Soumyadip, et al. "Background Matting: The World is Your Green Screen." arXiv preprint arXiv:2004.00626v2 (2020). (Year: 2020).*

Javidnia, Hossein, and François Pitié. "Background matting." arXiv preprint arXiv:2002.04433v1 (2020). (Year: 2020).*

PCT International Search Report and the Written Opinion mailed May 7, 2022, issued in related International Application No. PCT/CN2021/130122, with partial English translation (8 pages).

* cited by examiner

MATTING NETWORK TRAINING METHOD AND MATTING METHOD

CROSS-REFERENCE TO RELATED APPLICATIONS

This application is a Continuation application of International Patent Application No. PCT/CN2021/130122, filed on Nov. 11, 2021, which is based on and claims priority to and benefits of Chinese Patent Application No. 202110910316.4, filed on Aug. 9, 2021. The entire content of all of the above-referenced applications is incorporated herein by reference.

TECHNICAL FIELD

This application relates to the field of computer vision technologies, and in particular, to a method for training an image matting network and an image matting method.

BACKGROUND

Image matting is a commonly used processing method in the field of computer vision technologies.

A static image matting algorithm (trimap) is widely used in the conventional image matting method to guide color feature extraction. A transition region is constrained by using color features of a foreground and a background, to determine foreground segmentation. Based on a manner of using the color features, the conventional image matting method includes a sampling-based method and a similarity-based method. In the sampling-based method, a pair of foreground or background pixels are used to represent transition region pixels, to obtain the foreground segmentation. In the similarity-based method, a foreground boundary is determined through the similarity of adjacent pixels between certain labels and the transition region. The two image matting methods do not involve semantic information and have a large calculation amount, and prediction effects of the two image matting methods may be degraded when the foreground and the background have similar color features.

The development of deep learning has greatly promoted the development of the image matting algorithm. In a deep learning-based image matting algorithm, a trimap-based method has been extensively studied. Although precision of the trimap-based method is relatively high, manual labeling on a given image is required to increase an additional constraint for image matting. The manual labeling method is unfriendly to users and has poor practicability. In addition, the calculation amount is relatively large.

In recent years, a trimap-free image matting method has attracted more attention. In the past two years, a mainstream solution is to directly predict foreground segmentation by using a single RGB image. However, such a solution has a large calculation amount, and the precision of the solution is not higher than that of the trimap-based method. In addition, the solution is sensitive to scenarios, generalization still needs to be improved, and network performance may be degraded especially when an input includes unknown objects or a plurality of foregrounds.

To balance the advantages and disadvantages of the trimap-based method and the trimap-free method, currently, there is a method in which a background image and foreground soft segmentation of a portrait are used to replace a trimap as a prior of a background segmentation algorithm. Such a method has a large calculation amount and a slow speed, and an effect of processing a scenario of human holding an item or a non-human scenario may be degraded.

SUMMARY

In view of this, embodiments of this application provide an image matting method and a method for training an image matting network, which can resolve at least one technical problem in existing technologies.

According to a first aspect, an embodiment of this application provides a method for training an image matting network, including: obtaining a training sample set and an initial network, and training the initial network by using the training sample set to obtain the image matting network. The training sample set includes a plurality of training samples, each of the training samples includes an input image sample, the input image sample includes a first image sample having a foreground, a second image sample having a background, and a soft segmentation sample of the foreground. The soft segmentation sample is generated by subtracting a second depth image corresponding to the second image sample from a first depth image corresponding to the first image sample. The initial network includes at least one stage network, where the at least one stage network includes a context combining module, a stem block, and a predictor module. The input image sample is inputted into the context combining module, the context combining module is configured to output a low-order feature and a high-order feature after feature exchange, the stem block is configured to fuse the low-order feature and the high-order feature based on an attention mechanism to obtain a fused feature, and the predictor module is configured to output a predicted foreground segmentation according to the fused feature.

In this embodiment, the soft segmentation including the foreground is used as a prior for model training. Since the soft segmentation prior is used, background image matting becomes a task that relies less on semantics but more on structural information, and the network is not necessarily deep. In this way, lightweight of the network is achieved, and the network can be deployed on a chip with a small computation power. The stem block may achieve better high-level feature fusion, and the context combining module is more lightweight than a corresponding residual network and effectively exchanges inputted context features, which is conducive to a fusion process of context information. The two modules improve the precision to achieve more reliable foreground segmentation prediction.

In an embodiment of the first aspect, each of the training samples includes the input image sample and a label of the input image sample; and the training the initial network by using the training sample set to obtain an image matting network includes: performing supervised training on the initial network by using the training sample set, to obtain the image matting network.

In this embodiment, supervised training is performed to achieve an image matting network with a higher precision.

In an embodiment of the first aspect, the training sample set includes a plurality of labeled training samples and a plurality of unlabeled training samples, each of the labeled training samples includes the input image sample and a label of the input image sample, and each of the unlabeled training samples includes the input image sample; and the training the initial network by using the training sample set to obtain an image matting network includes: performing supervised training on the initial network by using the labeled training samples, and performing unsupervised knowledge distillation by using the unlabeled training samples, to obtain the image matting network.

In this embodiment, a difference between a synthetic dataset and real data may be made up in combination with supervised training and distillation learning, which is conducive to improving the segmentation precision of the image matting network and providing a network with good generalization.

In an embodiment of the first aspect, the at least one stage network includes a plurality of stage networks; and the input image sample is inputted to a first stage network of the plurality of stage networks, and the first image sample, the second image sample, and a predicted foreground segmentation outputted by the first stage network are inputted to a next stage network of the plurality of stage networks.

In this embodiment, the initial network includes a plurality of stage networks connected in series, so that finer structural details may be predicted, thereby further improving the precision of foreground segmentation prediction.

In an embodiment of the first aspect, the at least one stage network is configured to perform three downsamplings.

In this embodiment, rich structural clues may be retained by downsampling the inputs for merely 3 times, and a speed and precision may be better balanced benefiting from the fusion of background information.

In an embodiment of the first aspect, the stem block includes a feature fusion module based on the attention mechanism. In an embodiment of the first aspect, a hybrid loss function is used for training, and the hybrid loss function includes a mean square error loss, a structural similarity loss, and an intersection over union loss.

In this embodiment, a foreground and a boundary can be detected more precisely because of the use of the hybrid loss function, thereby further improving the precision of the foreground segmentation prediction.

According to a second aspect, an embodiment of this application provides an image matting method, including: obtaining a first image including a foreground, a second image including a background, and soft segmentation of the foreground; and inputting the first image, the second image, and the soft segmentation into an image matting network, and outputting a foreground segmentation of the first image. The image matting network includes at least one stage network that includes a context combining module, a stem block, and a predictor module. The first image, the second image, and the soft segmentation of the foreground are inputted into the context combining module, the context combining module is configured to output a low-order feature and a high-order feature after feature exchange, the stem block is configured to fuse the low-order feature and the high-order feature based on an attention mechanism to obtain a fused feature, and the predictor module is configured to output the foreground segmentation according to the fused feature.

According to a third aspect, an embodiment of this application provides an apparatus for training an image matting network, including: an obtaining module, configured to obtain a training sample set and an initial network, where the training sample set includes a plurality of training samples, each training sample includes an input image sample, the input image sample includes a first image sample having a foreground, a second image sample having a background, and a soft segmentation sample of the foreground, and the soft segmentation sample is generated by subtracting a second depth image corresponding to the second image sample from a first depth image corresponding to the first image sample; and the initial network includes at least one stage network, where the at least one stage network includes a context combining module, a stem block, and a predictor module that are connected in series, the input image sample is inputted into the context combining module, the context combining module is configured to output a low-order feature and a high-order feature after feature exchange, the stem block is configured to fuse the low-order feature and the high-order feature based on an attention mechanism to obtain a fused feature, and the predictor module is configured to output a predicted foreground segmentation according to the fused feature; and a training module, configured to train the initial network by using the training sample set to obtain an image matting network.

According to a fourth aspect, an embodiment of this application provides an image matting apparatus, including: an obtaining module, configured to obtain a first image including a foreground, a second image sample including a background, and soft segmentation of the foreground; and an image matting module, including an image matting network, and configured to input the first image, the second image, and the soft segmentation into an image matting network, to output a foreground segmentation of the first image; the image matting network includes at least one stage network; and the stage network includes a context combining module, a stem block, and a predictor module that are connected in series, the to-be-matted image, the background image, and the soft segmentation of the foreground are inputted into the context combining module, the context combining module is configured to output a low-order feature and a high-order feature after feature exchange, the stem block is configured to fuse the low-order feature and the high-order feature based on an attention mechanism to obtain a fused feature, and the predictor module is configured to output the foreground segmentation according to the fused feature.

According to a fifth aspect, an embodiment of this application provides an electronic device, including a memory, a processor, and a computer program stored in the memory and executable on the processor, the processor, when executing the computer program, implementing a method for training an image matting network, where the method for training an image matting network includes: obtaining a training sample set and an initial network, and training the initial network by using the training sample set to obtain the image matting network. The training sample set includes a plurality of training samples, each of the training samples includes an input image sample, the input image sample includes a first image sample having a foreground, a second image sample having a background, and a soft segmentation sample of the foreground. The soft segmentation sample is generated by subtracting a second depth image corresponding to the second image sample from a first depth image corresponding to the first image sample. The initial network includes at least one stage network, where the at least one stage network includes a context combining module, a stem block, and a predictor module. The input image sample is inputted into the context combining module, the context combining module is configured to output a low-order feature and a high-order feature after feature exchange, the stem block is configured to fuse the low-order feature and the high-order feature based on an attention mechanism to obtain a fused feature, and the predictor module is configured to output a predicted foreground segmentation according to the fused feature.

According to a sixth aspect, an embodiment of this application provides an electronic device, including a memory, a processor, and a computer program stored in the memory and executable on the processor, the processor, when executing the computer program, implementing an image matting method, where the image matting method includes: obtaining a first image including a foreground, a second image including a background, and soft segmentation of the foreground; and inputting the first image, the second image, and the soft segmentation into an image matting network, and outputting a foreground segmentation of the first image. The image matting network includes at least one stage network that includes a context combining module, a stem block, and a predictor module. The first image, the second image, and the soft segmentation of the foreground are inputted into the context combining module, the context combining module is configured to output a low-order feature and a high-order feature after feature exchange, the stem block is configured to fuse the low-order feature and the high-order feature based on an attention mechanism to obtain a fused feature, and the predictor module is configured to output the foreground segmentation according to the fused feature.

According to a seventh aspect, an embodiment of this application provides a non-transitory computer-readable storage medium, storing a computer program, the computer program, when executed by a processor, implementing a method for training an image matting network, where the method for training an image matting network includes: obtaining a training sample set and an initial network, and training the initial network by using the training sample set to obtain the image matting network. The training sample set includes a plurality of training samples, each of the training samples includes an input image sample, the input image sample includes a first image sample having a foreground, a second image sample having a background, and a soft segmentation sample of the foreground. The soft segmentation sample is generated by subtracting a second depth image corresponding to the second image sample from a first depth image corresponding to the first image sample. The initial network includes at least one stage network, where the at least one stage network includes a context combining module, a stem block, and a predictor module. The input image sample is inputted into the context combining module, the context combining module is configured to output a low-order feature and a high-order feature after feature exchange, the stem block is configured to fuse the low-order feature and the high-order feature based on an attention mechanism to obtain a fused feature, and the predictor module is configured to output a predicted foreground segmentation according to the fused feature.

According to an eighth aspect, an embodiment of this application provides a computer-readable storage medium, storing a computer program, the computer program, when executed by a processor, implementing an image matting method, where the image matting method includes: obtaining a first image including a foreground, a second image including a background, and soft segmentation of the foreground; and inputting the first image, the second image, and the soft segmentation into an image matting network, and outputting a foreground segmentation of the first image. The image matting network includes at least one stage network that includes a context combining module, a stem block, and a predictor module. The first image, the second image, and the soft segmentation of the foreground are inputted into the context combining module, the context combining module is configured to output a low-order feature and a high-order feature after feature exchange, the stem block is configured to fuse the low-order feature and the high-order feature based on an attention mechanism to obtain a fused feature, and the predictor module is configured to output the foreground segmentation according to the fused feature.

According to a ninth aspect, an embodiment of this application provides a computer program product, the computer program product, when executed on an electronic device, causing the electronic device to perform the method for training an image matting network according to the first aspect, or perform the image matting method according to the second aspect.

It should be understood that, for beneficial effects of the second aspect to the seventh aspect, reference may be made to the relevant description in the first aspect or any embodiment in the first aspect, and details are not described herein again.

BRIEF DESCRIPTION OF THE DRAWINGS

To describe the technical solutions of the embodiments of this application more clearly, the following briefly introduces the accompanying drawings required for describing the embodiments or existing technologies. Apparently, the accompanying drawings in the following description show only some embodiments of this application, and a person of ordinary skill in the art may still derive other drawings according to the accompanying drawings without creative efforts.

DETAILED DESCRIPTION

In the following description, for the purpose of illustration rather than limitation, details such as the system structure and technology are proposed to thoroughly understand the embodiments of this application. However, a person skilled in the art knows that this application may be implemented in other embodiments without these details. In other cases, detailed descriptions of well-known systems, apparatuses, circuits, and methods are omitted to avoid unnecessary details hindering the description of this application.

A term "and/or" used in this specification of this application and the appended claims refers to one or more of any and all possible combinations of the associated items that is listed and includes the combinations.

The terms such as "an embodiment" or "some embodiments" described in this specification of this application means that particular features, structures, or characteristics described with reference to the embodiment or embodiments may be included in one or more embodiments of this application. Therefore, the phrases "in one embodiment", "in some embodiments", "in other embodiments", "in some other embodiments", and the like in different parts of this specification are not necessarily refer to the same embodiment, but mean "one or more but not all embodiments", unless specifically emphasized otherwise. The terms "including", "including", "having" and their variations all mean "including but not limited to", unless otherwise specifically emphasized.

In addition, in the description of this application, "a plurality of" means two or more than two. The terms such as "first" and "second" are merely used for distinguishing descriptions and should not be understood as indicating or implying relative importance.

To describe technical solutions in this application, the following will be described by using the embodiments.

Figure 1:
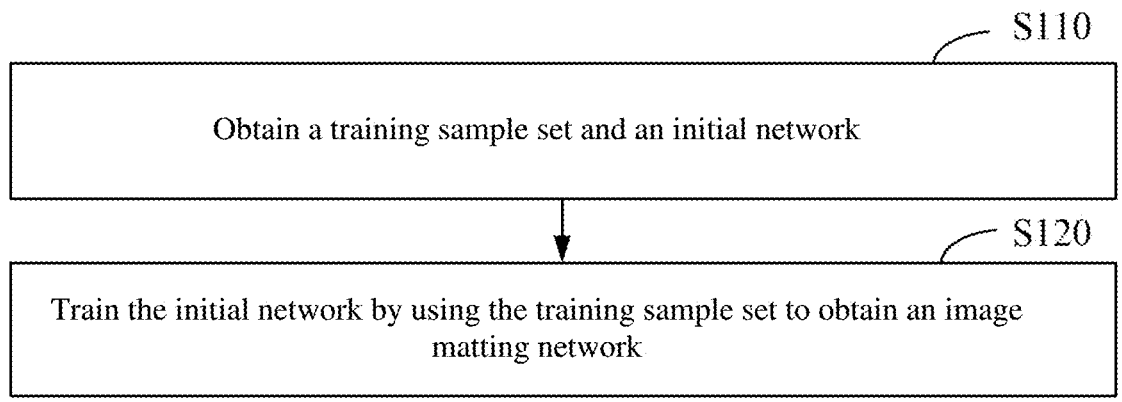
FIG. 1 is a flowchart of implementation of a method for training an image matting network according to an embodiment of this application.

FIG. 1 is a flowchart of implementation of a method for training an image matting network according to an embodiment of this application. The method for training an image matting network in this embodiment may be performed by an electronic device. The electronic device includes but not limited to a computer, a tablet computer, a server, a mobile phone, a camera, a wearable device, or the like. The server includes but not limited to an independent server, a cloud server, or the like. As shown in FIG. 1, the method for training an image matting network may include steps S110 and S120.

S110: Obtain a training sample set and an initial network.

S120: Train the initial network by using the training sample set to obtain an image matting network.

The initial network is pre-stored in the electronic device as a to-be-trained network model. The initial network includes a set of to-be-learned network parameters. The initial network is trained to obtain the image matting network. The image matting network may have a network structure the same as that of the initial network, or may have a network structure simpler than that of the initial network, where network parameters of the initial network and the image matting network are different.

The initial network (or the image matting network) may include a deep learning-based neural network model, for example, a stem network such as ResNet (Residual Network) or VGG (Visual Geometry Group).

It is to be noted that, current background image matting networks have larger redundancy. This is because the stem network such as ResNet or VGG are usually used, and the networks are originally designed for an image classification task that is highly relied on semantics. In view of this, the networks may generally perform 5 times of downsampling to extract a strong semantic feature. However, in this embodiment of this application, since soft segmentation is used as a prior feature of image matting, background image matting becomes a task that relies less on the semantics but more on the structure. Therefore, the networks have larger redundancy to a certain extent.

In an embodiment, the initial network (or the image matting network) uses a lightweight refinement network (LRN). The initial network (or the image matting network) includes a stage network or a plurality of stage networks connected in series. The initial network uses an RGB image I including a foreground, an RGB background image B, and soft segmentation S of the foreground as priors. The soft segmentation may be generated by using a depth image, and lightweight is achieved through a network design. An output of the model is refined for a plurality of times, which can achieve the more reliable foreground segmentation prediction.

Figure 2:
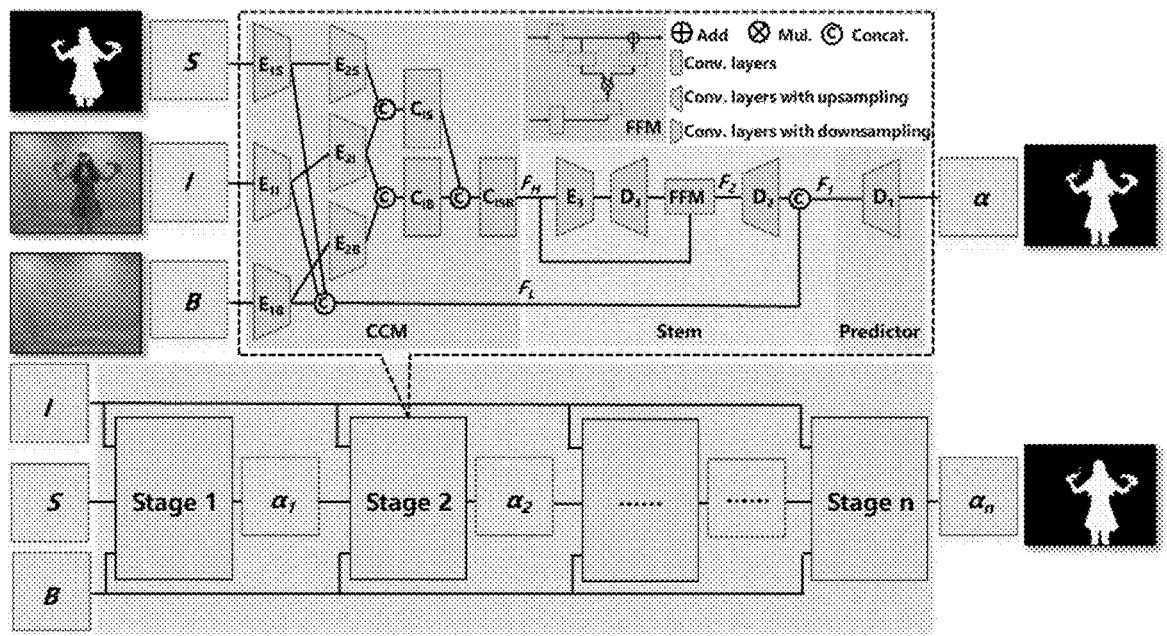
FIG. 2 is a schematic structural diagram of an image matting model according to an embodiment of this application.

In an embodiment, the initial network may be defined as $G(I, B, S; \varphi)$, which includes three input images: an RGB image I, an RGB background image B, and soft segmentation S of a foreground, and $\varphi$ represents a network parameter to be determined during the training. The network structure of the initial network is shown in FIG. 2, including a stage network or a plurality of stage networks connected in series. One stage network includes a context combining module (CCM), a stem block, and a predictor module. The three input images are inputted into the CCM module. The CCM module is configured to output a low-order feature and a high-order feature after the feature exchange. The stem block may include a feature fusion module (FFM) and is configured to fuse the low-order feature and the high-order feature based on an attention mechanism to obtain a fused feature. The predictor module is configured to output a predicted foreground segmentation according to the fused feature.

For example, the feature exchange is performed on the three input images by using the CCM module, to generate two output features, namely, a low-order feature $F_L$ and a high-order feature $F_H$. Low-order features corresponding to the input images are separately encoded as features $F_{1I}=E_{1I}(I)$, $F_{1B}=E_{1B}(B)$, and $F_{1S}=E_{1S}(S)$, and then the features are concatenated to generate an overall low-order feature $F_L=Cat(F_{1I},F_{1B},F_{1S})$, where Cat represents a concatenating operation. In another branch, the low-order features are downsampled to single high-order features $F_{2I}=E_{2I}(F_{1I})$, $F_{2B}=E_{2B}(F_{1B})$, and $F_{2S}=E_{2S}(F_{1S})$. An image feature is fused with other two features, to obtain $F_{1S}$, $C_{1S}(Cat(F_{2I},F_{2S}))$ and $F_{1B}=C_{1B}(Cat(F_{2I},F_{2B}))$. An overall high-order feature is obtained by using $F_H=C_{ISB}(Cat(F_{1B},F_{1S}))$. In the stem block of the network, an encoder $E_3$ first performs downsampling on the high-order feature $F_H$, a decoder $D_3$ performs upsampling, and then features are fused by using the feature fusion module, to obtain a feature $F_2=FFM(F_H,D_3(E_3(F_H)))$. Further, the low-order feature $F_L$ is combined into the stem block, to obtain a fused feature $F_1=Cat(F_L,D_2(F_2))$. Finally, the predicted foreground segmentation is obtained by using $\alpha=D_1(F_1)$, to facilitate subsequent image synthesis by using the foreground segmentation and a preset background image. The low-order features may be processed by lower-level components of a machine learning system and can be detected or extracted from an input image. The high-order features may be learned in the later layers of the network and can capture more abstract concepts, for achieving a high accuracy of the image matting. For example, the higher-order features might recognize shapes or textures in the images, while the low-level features might detect edges and color gradients in the images.

The foregoing process is referred to as a stage. To predict finer structural details, in some embodiments of this application, another stage may be used to further refine an output of a last stage, and predicted foreground segmentation of the last stage is used as the prior soft segmentation of a next stage, while an RGB image I and an RGB background image B inputted in the last stage are still used as priors of the next stage. Such a process may be repeated for a plurality of times to form a serially connected network structure. To clearly represent a network architecture, C, B, and S are used to represent a quantity of channels in a convolutional layer, a quantity of convolutional blocks in a residual block, and a quantity of stages in the residual block, and the network is further represented as LRN-C-B-S. For example, LRN-16-4-3 represents an LRN constructed by a 16-channel convolutional layer, 4 blocks, and 3 stages. The advantage of the LRN is that the precision and speed can be easily balanced by adjusting C, B, and S.

It is to be noted that, FIG. 2 provides a more lightweight stem, that is, a stage, which only needs to perform 3 times of downsampling. A simple foreground soft segmentation is inputted, which is a binary image obtained by subtracting a background depth image (for example, a depth image corresponding to the RGB background image B) from a foreground depth image (for example, a depth image corresponding to the RGB image I). As a simple existing feature, the soft segmentation also provides an attention mechanism of an object on which image matting is performed. Therefore, feature extraction can be implemented by using less weight. In addition, the stage network exchanges context information of image+soft segmentation, image+background, and image+soft segmentation+background by using the CCM module, to fully extract boundary features. Compared with the early fusion, late fusion of the image and the trimap is more effective for the feature extraction performed on the image matting network, and there are 3 inputs in this example. The CCM module fuses single input images in pairs, and then performs the late fusion on the fused features, so that feature information of different inputs may be matched and learned more effectively. In addition, the CCM module extracts features of single inputs by using fewer convolutional layers, and then concatenates the features. According to such a design, the CCM module is more lightweight than a corresponding ResNet block module. This is because fewer convolution channels are introduced before concatenation.

Figure 3:
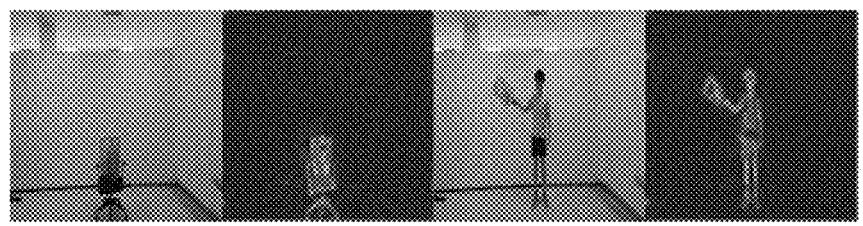
FIG. 3 is a single-channel heatmap of an FH layer according to an embodiment of this application.

In addition, the FFM module responsible for feature fusion is used to replace a conventional concatenating operation. The FFM module achieves better fusion of an encoder feature and a decoder feature by using the attention mechanism. Structural features in the encoder are extracted layer by layer to form high-order semantic features. The semantic features help the model to determine a position of a segmentation edge by using a wider receptive field range. For example, when colors of the foreground and the background are similar (for example, a black human head and a black background), it is difficult to directly determine a boundary (which is the boundary between the head and the black background) according to local structural information, but the high-order semantic information may be used to assist the determination of a segmentation position through empirical information (for example, the human head is usually round) obtained by performing the image recognition. The FFM module converts the high-order semantic feature of the encoder into a spatial attention mask for guiding the restoration of structural information in the decoder. Since only the high-order semantic feature can provide accurate spatial attention, the FFM module is not suitable for a low-order feature from the encoder. Therefore, in the network design, the FFM module is only applied to an inner skip connection, but not to an outer skip connection. Based on the above, a lightweight design is made for the network from three aspects. First, a network depth is relatively shallow. The network is different from the conventional stem network such as ResNet and GoogleNet which performs downsampling on inputs for 5 times to extract rich semantic clues. Background image matting becomes a task relies less on semantics but more on structural information because of use of soft segmentation prior, and the network is not necessarily deep. Downsampling is performed on the inputs only for 3 times, and obtained semantic information is sufficient and rich structural clues are retained. Second, a quantity of channels is relatively small. Since background image matting is not a classification task, one channel can serve a plurality of objects. For example, FIG. 3 shows a single-channel heatmap of an $F_H$ layer. The channel indiscriminately captures foregrounds of difference types. In addition, inputted soft segmentation provides an existing feature, and therefore fewer channels are required for information extraction. Third, the CCM module is more lightweight than a corresponding residual network. A comparison test proves that, if the features are concatenated and the high-order feature $F_H$ is extracted by using the residual module, compared with the method by using the CCM module, such a method generates 1.8 G FLOPs (floating points) of additional operations and 0.3M of additional parameters, and the model performance becomes worse.

In some embodiments, the training sample set includes a plurality of training samples, each training sample includes an input image sample and a label (ground truth) of the input image sample. The input image sample includes three types, namely, a to-be-matted image sample I having a foreground, a background image sample B, and a soft segmentation sample S of the foreground. A label $\alpha\alpha^*$ may be manually labeled ground truth foreground segmentation, for example, the label includes a standard transparency mask corresponding to the to-be-matted image sample. In the embodiments, labeled training samples are used, and step S120 includes: performing supervised training on the initial network by using the training sample set, to obtain the image matting network.

In some embodiments, the initial network is trained by using an Adobe dataset including 493 foreground objects, and a synthetic dataset is created. The to-be-matted image sample may select a non-transparent object (for example, removing a glass product, and the like) from the Adobe dataset, or may further be randomly expanded in one or a combination of manners such as cropping, rotating, flipping, or adding Gaussian noise. The background image sample may be randomly extracted from an MS COCO dataset and may be expanded in one or a combination of manners such as gamma correction or adding Gaussian noise, to avoid highly relying on a fixed value of the background. The soft segmentation sample of the foreground may be generated by subtracting a depth image corresponding to the background image sample from a depth image corresponding to the to-be-matted image sample, for example, a binary image generated by subtracting the depth image corresponding to the background image sample from the depth image corresponding to the to-be-matted image sample. In an embodiment, the inputted soft segmentation sample of the foreground may simulate defective real-world segmentation in one or a combination of operations such as erosion, dilation, or blurring performed by the ground truth foreground segmentation.

A supervised training task performed on the synthetic dataset may be defined as updating a network parameter $\varphi_{syn}$ to reduce a loss function L:

$$\min_{\varphi_{syn}} \mathbb{E}_{I,B,S,\alpha^* \sim \text{Synthetic Dataset}} \{L[\alpha^*, G(\cdot\,;\varphi_{syn})]\}.$$

In an embodiment, the network is trained by using a hybrid loss function including different loss functions, for example, including a mean square error (MSE) loss, a structural similarity (SSIM) loss, and an intersection over union (IoU) loss. The MSE loss function is a regular pixel regression loss for segmentation supervision. The SSIM loss function imposes a constraint on a mean value and a standard deviation, to better predict structural consistency. The IoU loss function commonly used in an image segmentation task pays more attention to optimization of a global structure. The SSIM loss function is used for predicting a finer boundary, while the IoU loss function is used for predicting a more complete foreground. The foreground and the boundary may be detected more precisely because of use of the hybrid loss function. In an embodiment, weight of three different loss functions is used as the hybrid loss function, which is also referred to as a joint loss function and is defined as follows:

$$L = \lambda_1 L_{MSE} + \lambda_2 L_{SSIM} + \lambda_3 L_{IoU}.$$

$\lambda_1$, $\lambda_2$, and $\lambda_3$ are respective weight coefficients of the three different loss functions. In an embodiment, the weight coefficients of the three loss functions may be assigned as $\lambda_1=2$, $\lambda_2=2$, and $\lambda_3=5$. $L_{MSE}$ is an MSE loss and is defined as follows:

$$L_{MSE} = \frac{\sum_{i=1}^{H} \sum_{j=1}^{W} (\alpha_{i,j} - \alpha_{i,j}^*)^2}{HW}.$$

H and W respectively represent a height and width of the image; and $\alpha_{i,j}$ and $\alpha_{i,j}^*$ represent predicted foreground segmentation and prior foreground segmentation. $L_{SSIM}$ is an SSIM loss and is defined as follows:

$$L_{SSIM} = 1 - \frac{(2\mu\mu^* + c_1)(2\sigma\sigma^* + c_2)}{(\mu^2 + \mu^{*2} + c_1)(\sigma^2 + \sigma^2 + c_2)}.$$

$\mu$, $\sigma$ and $\mu^*$, $\sigma^*$ are mean values and deviations of $\alpha_{i,j}$ and $\alpha_{i,j}^*$. Constants $c_1=0.01^2$ and $c_2=0.03^2$ are used to prevent division by zero. $L_{IoU}$ is an IoU loss and is defined as follows:

$$L_{IoU} = 1 - \frac{\sum_{i=1}^{H} \sum_{j=1}^{W} (\alpha_{i,j} \alpha_{i,j}^*)(1 + \gamma\theta_{i,j})}{\sum_{i=1}^{H} \sum_{j=1}^{W} (\alpha_{i,j} + \alpha_{i,j}^* - \alpha_{i,j} \alpha_{i,j}^*)(1 + \gamma\theta_{i,j})}.$$

A parameter $\gamma$ may be set to 5. $\theta_{i,j}$ is a difficulty index of a pixel (i,j) and may be determined by using the following formula:

$$\theta_{i,j} = \left| \frac{\sum_{m,n \in A_{i,j}} \alpha_{m,n}^*}{\sum_{m,n \in A_{i,j}} 1} - \alpha_{i,j}^* \right|.$$

$A_{i,j}$ represents an adjacent pixel of the pixel (i,j).

To make up a difference between synthetic data and real data, in some embodiments of this application, in addition to performing supervised training by using labeled synthetic images, unlabeled real images may also be used to perform unsupervised knowledge distillation.

In this case, the training sample set includes a plurality of labeled training samples and a plurality of unlabeled training samples, each labeled training sample includes an input image sample and a label of the input image sample, and each unlabeled training sample includes the input image sample. It is to be noted that, in the embodiments, the input image sample also includes 3 types, namely, a to-be-matted image sample I having a foreground, a background image sample B, and soft segmentation sample S of the foreground. In the embodiments, labeled and unlabeled training samples, that is, a hybrid dataset is used, and step S120 includes: performing supervised training on the initial network by using the plurality of labeled training samples, and performing unsupervised knowledge distillation by using the plurality of unlabeled training samples, to obtain the image matting network.

Figure 4:
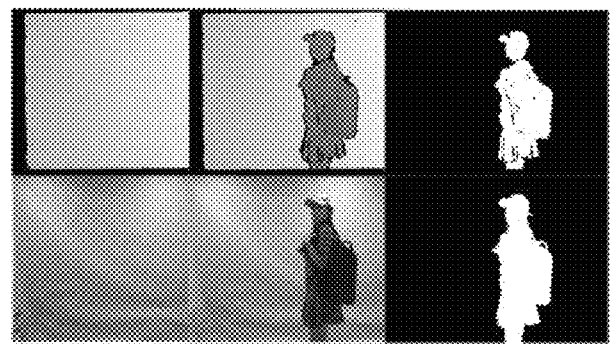
FIG. 4 is a schematic diagram of a real-world image set according to an embodiment of this application.

In some embodiments, a real-world dataset in which human holds an object is created, including 1259 labeled images used as a test set and 11255 unlabeled images used as a knowledge distillation training set. All images are captured by a depth camera. FIG. 4 shows RGB images and depth images of the background and foreground, that is, a real-world image dataset. From the upper left to the lower right are a depth background, a depth image, soft segmentation, a color background, a color image, and ground truth foreground segmentation. The soft segmentation is a binary image obtained by subtracting the background depth from the image depth. The 1259 labeled images are captured from 11 scenarios, with an average of 2.5 people per scenario, each person showing more than 30 items in 1 to 3 poses, and the dataset implements qualitative evaluation of algorithms on the real-world dataset.

A hybrid dataset including 10000 labeled synthetic images and 11255 unlabeled real-world images is used. Supervised training and unsupervised knowledge distillation are simultaneously performed on the hybrid dataset. A network trained on the synthetic dataset is used as a teacher model. The network may be a complex network model such as ResNet or VGG. For labeled data, training is performed by using $$\min_{\varphi} \mathbb{E}_{I,B,S,\alpha^* \sim Synthetic\ Dataset} \{L[\alpha^*, G_s(\cdot; \varphi)]\};$$

and for unlabeled data, distillation learning is performed by using $$\min_{\varphi} \mathbb{E}_{I,B,S \sim Real\ Dataset} \{L[G_t(\cdot; \varphi_{syn}), G_s(\cdot; \varphi)]\}.$$

$G_t(; \varphi_{syn})$ represents a teacher network trained on the synthetic dataset, and $G_s(; \varphi)$ represents a student network which may be a lightweight image matting network in this application, and L is a hybrid loss function or a joint loss function.

An embodiment of this application provides an image matting method. The image matting method is applicable to an electronic device. An image matting network is pre-deployed in the electronic device. In some embodiments, the image matting network may be an initial network that is untrained. In some embodiments, to improve the precision of image matting, the image matting network may be an initial network, or the image matting network may be obtained through the training in the method of the foregoing embodiments. The image matting network includes at least one stage network. The stage network includes a CCM module, a stem block, and a predictor module that are connected in series. When background image matting is performed on the to-be-matted image by using the image matting network, three to-be-inputted images are first obtained, where the three images include: a to-be-matted image including a foreground, a background image, and soft segmentation of the foreground, and then the three images are inputted into the image matting network to output the foreground segmentation of the to-be-matted image. For example, the three images are inputted into the CCM module. The CCM module is used to output a low-order feature and a high-order feature after the feature exchange. The stem block is configured to fuse the low-order feature and the high-order feature based on an attention mechanism to obtain a fused feature. The predictor module is configured to output foreground segmentation according to the fused feature.

It should be understood that, for a process of performing background image matting by using the image matting network, reference may be made to the relevant description of the process of training the image matting network. Details are not repeated herein again.

An embodiment of this application provides a lightweight real-time background image matting network. A shallow structure design is made for the network, and two network modules are provided. The FFM module can achieve better high-level feature fusion. The CCM module is more lightweight than a corresponding conventional residual module, which is conducive to the fusion of context information. The two modules improve the precision to a certain extent. To achieve the better boundary prediction and foreground prediction, a hybrid loss function is introduced, which combines advantages of MSE, SSIM, and IoU losses. A real-world dataset including 1259 labeled images and 11255 unlabeled images is created for quantitative evaluation and knowledge distillation. Experiments on the synthetic dataset and a real dataset show that the method achieves real-time performance on both PC (111FPS) and an Amlogic A311D chip (45FPS).

Experiments were carried out based on the method provided in the embodiments of this application, an Adam optimizer with a learning rate of 10-3 was used, and an LRN-32-4-4 model was trained by using 26900 synthetic images. The LRN-32-4-4 was selected because of good balance between the precision and the speed. The model was trained for 100 rounds on 4 RTX2080ti GPUs with batch-size=16 and an input resolution of 512×512. Model performance was evaluated by using a test dataset (an Adobe test set, which is also referred to as Composite-1k) composed of 1000 synthetic images. After supervised training is performed on the LRN-32-4-4 model by using the synthetic dataset, distillation learning is performed on the trained LRN-32-4-4 model, to obtain a more lightweight LRN-16-4-3 model, where parameter settings for distillation learning are the same as settings for supervised learning.

Four indicators MSEt, SADt, MSEe, and SADe are used in the experiments to evaluate the model precision. MSE and SAD respectively represent a mean square error and a sum of absolute difference. The subscripts "t" and "e" represent evaluation errors in a trimap region and a whole image. Previous studies only use MSEt and SADt, which are sufficient for a trimap-based method. This is because a foreground region is known. However, for a trimap-free method that need to predict both foreground and unknown regions, the MSEe and SADe are introduced to obtain more complete evaluation. On the Composition-1k dataset, the method in the embodiments of this application is compared with other 4 learning-based models, including trimap-based CAM and DIM, and trimap-free LFM and BM. On the real dataset, the model provided in the embodiments of this application is also compared with the CAM, DIM, and BM models. It is to be noted that, comparisons with conventional methods are excluded because the conventional methods have been shown to be far less precise than the learning-based methods.

Figure 5:
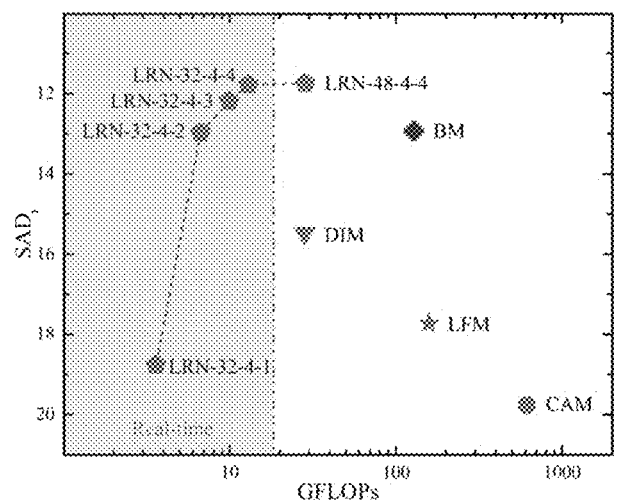
FIG. 5 shows comparison results between speeds and precision levels of different models on a Composition-1k dataset.

For example, during the experiment, a foreground segmentation error, FLOPs (based on a resolution of 288×288) and a quantity of parameters Param were evaluated on the Composite-1k test set. FIG. 5 shows comparison results between speeds and precision levels of different models on a Composition-1k dataset. The comparison results between errors and speeds of different models on the Composition-1k dataset are shown in Table 1 below. A model ours in this embodiment of this application adopts the LRN-32-4-4 model. The comparison results between errors and speeds of different models on the real dataset are shown in Table 2 below. The model ours in this embodiment of this application adopts the LRN-16-4-3 model. Since CAM and DIM are trimap-based methods, there are only indicators SADt and MSEt. It can be seen from Table 1 and FIG. 5 that, the model (LRN-32-4-4) provided in this embodiment of this application is superior to other methods in all four indicators and is significantly lightweight. For example, at an input resolution of 288×288, the method in this embodiment of this application has 13.0 G of FLOPs and 2.2M of parameters. Compared with the BM method, the FLOPs are reduced by 89.9%, and the quantity of parameters Param is reduced by 87.7%. Model inference of 39FPS is realized on GTX1060tiGPU, which meets the requirements of real-time inference, where real-time means that an inference speed is greater than 30FPS.

TABLE 1

| Model | $SAD_t$ | $MSE_t$ | $SAD_e$ | $MSE_e$ | FLOPs/G | Param./M |
|---|---|---|---|---|---|---|
| CAM | 19.77 | 0.0245 | — | — | 612.8 | 107.4 |
| LFM | 17.73 | 0.0169 | 25.80 | 0.0027 | 158.2 | 37.9 |
| DIM | 15.48 | 0.0139 | — | — | 28.3 | 49.1 |
| BM | 12.93 | 0.0123 | 12.69 | 0.0013 | 128.2 | 17.9 |
| Ours | 11.78 | 0.0099 | 12.57 | 0.0012 | 13.0 | 2.2 |

TABLE 2

| Model | $SAD_t$ | $MSE_t$ | $SAD_e$ | $MSE_e$ | FLOPs/G | Param./M |
|---|---|---|---|---|---|---|
| CAM | 3.82 | 0.0309 | — | — | 612.8 | 107.4 |
| LFM | 3.53 | 0.0276 | 33.98 | 0.0225 | 158.2 | 37.9 |
| DIM | 2.63 | 0.0185 | — | — | 28.3 | 49.1 |
| BM | 2.62 | 0.0174 | 3.79 | 0.0012 | 128.2 | 17.9 |
| Ours | 2.10 | 0.0151 | 2.37 | 0.0008 | 2.6 | 0.4 |

Figure 6:
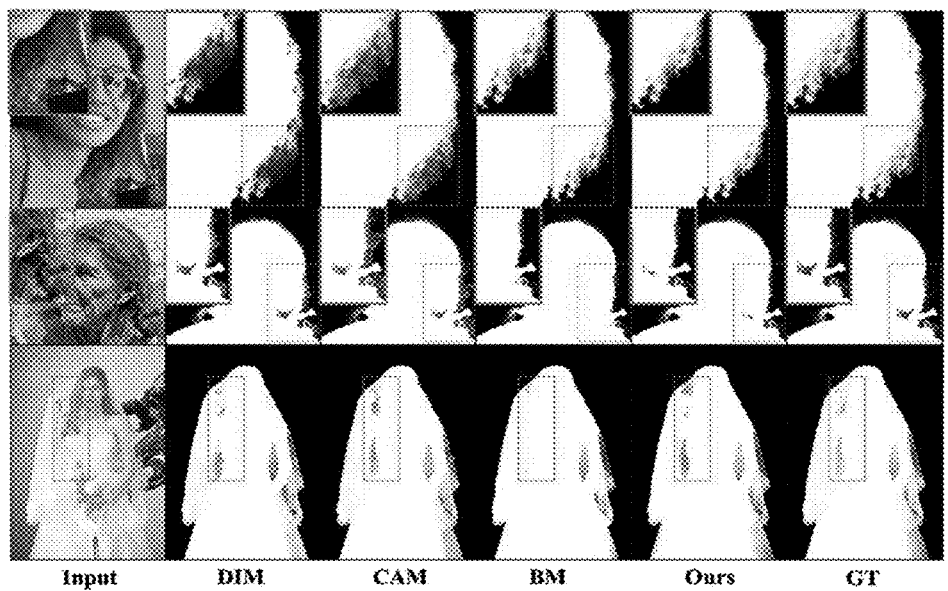
FIG. 6 is a schematic diagram of qualitative comparison results between different methods on a Composite-1k test set.
Figure 7:
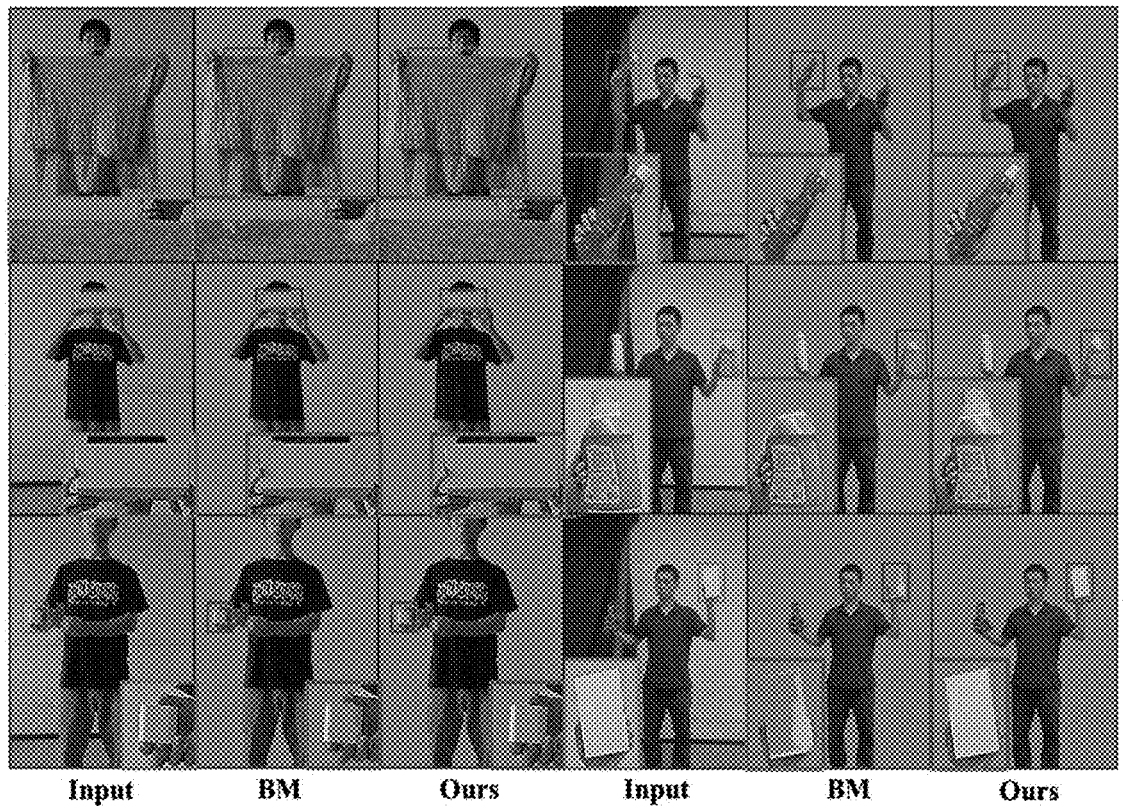
FIG. 7 is a schematic diagram of comparison results between a method according to an embodiment of this application and a BM method on real-world images.

FIG. 6 shows a schematic diagram of qualitative comparison results between different methods on a Composite-1k test set. The method provided in the embodiments of this application has strong robustness to background interference. For example, the method shows better foreground and background discrimination capabilities, which can detect small background regions surrounded by a foreground. FIG. 7 shows a schematic diagram of comparison results between a method according to an embodiment of this application and a BM method on real-world images. According to FIG. 7, it can be seen that the BM method has difficulty in detecting a foreground with the same color as the background, for example, a white box in front of a white wall.

It is to be understood that the order of the sequence numbers of the steps in the foregoing embodiments does not mean the order of execution, and the execution order of each process is determined according to a function and inherent logic of each process, and should not be construed as any limitation on the implementation processes of the embodiments of this application.

An embodiment of this application further provides an apparatus for training an image matting network. For details not described in the apparatus for training an image matting network, reference may be made to the description of the embodiments of the image matting network training method.

Figure 8:
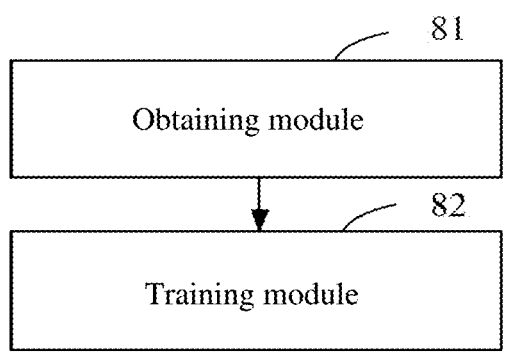
FIG. 8 is a schematic structural diagram of an apparatus for training an image matting network according to an embodiment of this application.

Referring to FIG. 8, FIG. 8 is a schematic block diagram of an apparatus for training an image matting network according to an embodiment of this application. The apparatus for training an image matting network includes an obtaining module 81 and a training module 82.

The obtaining module 81 is configured to obtain a training sample set and an initial network, where the training sample set includes a plurality of training samples, each training sample includes an input image sample, the input image sample includes a to-be-matted image sample having a foreground, a background image sample, and a soft segmentation sample of the foreground, and the soft segmentation sample is generated by subtracting a depth image corresponding to the background image sample from a depth image corresponding to the to-be-matted image sample; and the initial network includes at least one stage network, where the stage network includes a context combining module, a stem block, and a predictor module that are connected in series, the input image sample is inputted into the context combining module, the context combining module is configured to output a low-order feature and a high-order feature after feature exchange, the stem block is configured to fuse the low-order feature and the high-order feature based on an attention mechanism to obtain a fused feature, and the predictor module is configured to output predicted foreground segmentation according to the fused feature.

The training module 82 is configured to train the initial network by using the training sample set to obtain an image matting network.

In some embodiments, the training sample set includes a plurality of labeled training samples, and each labeled training sample includes the input image sample and a label of the input image sample. The training module 82 is further configured to: perform supervised training on the initial network by using the training sample set, to obtain the image matting network. In some embodiments, the training sample set includes a plurality of labeled training samples and a plurality of unlabeled training samples, each labeled training sample includes the input image sample and a label of the input image sample, and each unlabeled training sample includes the input image sample.

The training module 82 is further configured to: perform supervised training on the initial network by using the plurality of labeled training samples, and then performing unsupervised knowledge distillation by using the plurality of unlabeled training samples, to obtain the image matting network.

In some embodiments, the initial network includes a plurality of stage networks connected in series; and the input image sample is used as an input of the first stage network, and the to-be-matted image sample, the background image sample, and predicted foreground segmentation that is outputted by a last stage network are used as inputs of a next stage network.

In some embodiments, the stage network includes 3 times of downsampling.

In some embodiments, the stem block includes a feature fusion module based on the attention mechanism.

In some embodiments, the training module 82 uses a hybrid loss function, and the hybrid loss function includes a mean square error loss, a structural similarity loss, and an intersection over union loss.

An embodiment of this application further provides an image matting apparatus. For details not described in the image matting apparatus, reference may be made to the description of the embodiments of the image matting method.

Figure 9:
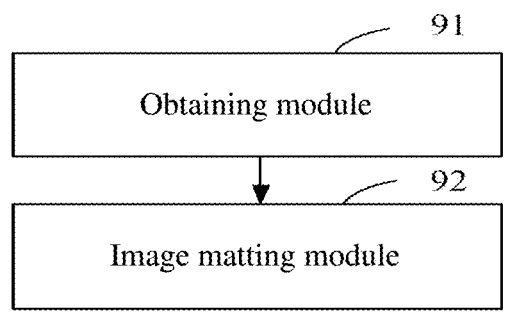
FIG. 9 is a schematic structural diagram of an image matting apparatus according to an embodiment of this application.

Referring to FIG. 9, FIG. 9 is a schematic block diagram of an image matting apparatus according to an embodiment of this application. The image matting apparatus includes an obtaining module 91 and an image matting module 92.

The obtaining module 91 is configured to obtain a to-be-matted image including a foreground, a background image, and soft segmentation of the foreground.

The image matting module 92 includes an image matting module and is configured to input the to-be-matted image, the background image, and the soft segmentation into an image matting network, to output foreground segmentation of the to-be-matted image, the image matting network includes at least one stage network; and the stage network includes a context combining module, a stem block, and a predictor module that are connected in series, the to-be-matted image, the background image, and the soft segmentation of the foreground are inputted into the context combining module, the context combining module is configured to output a low-order feature and a high-order feature after feature exchange, the stem block is configured to fuse the low-order feature and the high-order feature based on an attention mechanism to obtain a fused feature, and the predictor module is configured to output foreground segmentation according to the fused feature.

Figure 10:
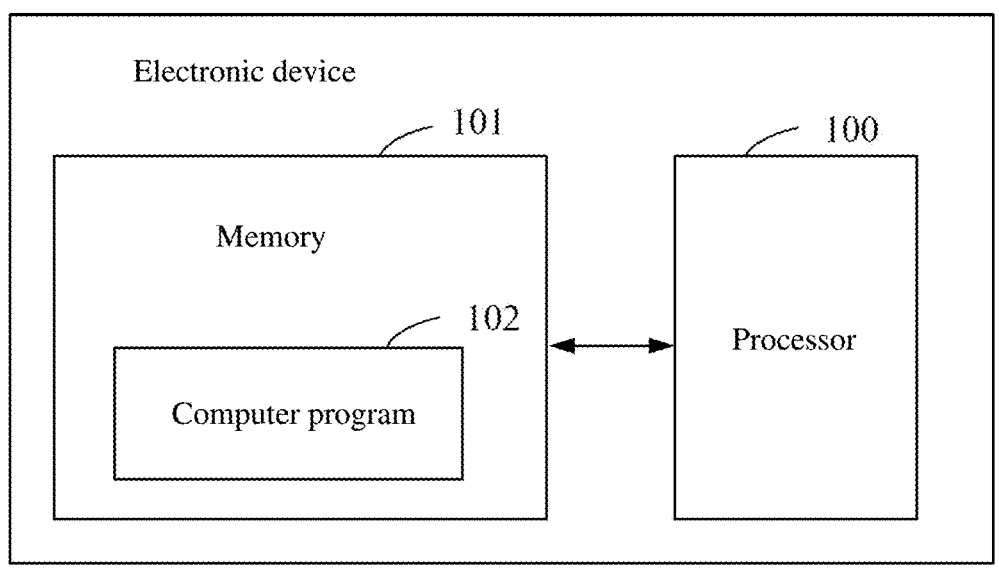
FIG. 10 is a schematic structural diagram of an electronic device according to an embodiment of this application.

An embodiment of this application further provides an electronic device. As shown in FIG. 10, the electronic device may include one or more processors 100 (where only one processor is shown in FIG. 10), a memory 101, and a computer program 102 stored in the memory 101 and runnable on the one or more processors 100, for example, a program for image matting network training and/or a program for image matting. The one or more processors 100 may implement the steps of the method for training an image matting network and/or the image matting method embodiments when executing the computer program 102. In an embodiment, the one or more processors 100 may implement functions of module/units in the apparatus for training an image matting network and/or the image matting apparatus embodiments when executing the computer program 102.

A person skilled in the art may understand that FIG. 10 is merely an example of the electronic device, and does not constitute a limitation to the electronic device. The electronic device may include more or fewer components than those shown in the figure, or some components may be combined, or different components may be used. For example, the electronic device may further include input and output devices, a network access device, a bus, and the like.

In an embodiment, the processor 100 may be a central processing unit (CPU), or may be another general-purpose processor, a digital signal processor (DSP), an application specific integrated circuit (ASIC), a field-programmable gate array (FPGA), or another programmable logic device, a discrete gate or a transistor logic device, a discrete hardware component, or the like. The general-purpose processor may be a microprocessor, or the processor may be any conventional processor and the like.

In an embodiment, the memory 101 may be an internal storage unit of the electronic device, for example, a hard disk or an internal memory of the electronic device. The memory 101 may also be an external storage device of the electronic device, for example, a removable hard disk, a smart media card (SMC), a secure digital (SD) card, a flash card, or the like equipped on the electronic device. Further, the memory 101 may also include both the internal storage unit and the external storage device of the electronic device. The memory 101 is configured to store the computer program and other programs and data required by the electronic device. The memory 101 may be further configured to temporarily store data that has been outputted or data to be outputted.

A person skilled in the art may clearly understand that, for the purpose of convenient and brief description, only division of the foregoing function units is used as an example for description. In the practical application, the functions may be allocated to and completed by different function modules according to requirements. That is, an internal structure of the device is divided into different functional units or modules, to complete all or some of the functions described above. Functional units and modules in the embodiments may be integrated into one processing unit, or each of the units may exist alone physically, or two or more units are integrated into one unit. The integrated unit may be implemented in the form of hardware, or may be implemented in the form of a software function unit. In addition, the names of each functional unit and module are only for the purpose of distinguishing each other, and are not used to limit the protection scope of this application. For work processes of the units and modules in the system, reference may be made to corresponding processes in the foregoing method embodiments, and details are not described herein again.

An embodiment of this application further provides a computer-readable storage medium, storing a computer program, the computer program, when executed by a processor, implementing the steps in the method embodiments of the method for training an image matting network and/or the image matting method.

An embodiment of this application provides a computer program product, the computer program product, when run on an electronic device, causing the electronic device to implement the steps in the method embodiments of the method for training an image matting network and/or the image matting method.

In the embodiments, descriptions of the embodiments have different emphases. As for parts that are not described in detail in one embodiment, reference can be made to the relevant descriptions of the other embodiments.

A person of ordinary skill in the art may be aware that the units and steps in the examples described with reference to the embodiments disclosed in this specification can be implemented by electronic hardware or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the embodiment goes beyond the scope of this application.

In the embodiments provided in this application, it is to be understood that the disclosed apparatus/electronic device and method may be implemented in other manners. For example, the embodiments of the described apparatus/electronic device are merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts can or cannot be physically separate. Parts displayed as units can or cannot be physical units, and can be located in one position, or can be distributed on a plurality of network units. Some or all of the units may be selected according to actual needs to achieve the objectives of the solutions of the embodiments.

In addition, functional units in the embodiments of this application may be integrated into one processing unit, or each of the units may be physically separated, or two or more units may be integrated into one unit. The integrated unit may be implemented in a form of hardware, or may be implemented in a form of a software functional unit.

When the integrated module/unit is implemented in the form of a software functional unit and sold or used as an independent product, the integrated unit may be stored in a computer-readable storage medium. Based on such understanding, all or some of the processes of the methods in the embodiments of this application may be implemented by a computer program instructing relevant hardware. The computer program may be stored in a computer-readable storage medium. During execution of the computer program by the processor, steps of the foregoing method embodiments may be implemented. The computer program includes computer program code. The computer program code may be in source code form, object code form, executable file or some intermediate forms, or the like. The computer-readable medium may include: any entity or apparatus that is capable of carrying the computer program code, a recording medium, a USB flash drive, a removable hard disk, a magnetic disk, an optical disc, a read-only memory (ROM), a random access memory (RAM), an electric carrier signal, a telecommunication signal and a software distribution medium, and the like. It is to be noted that, the content contained in the computer-readable medium may be appropriately increased or decreased according to the requirements of legislation and patent practice in jurisdictions. For example, in some jurisdictions, according to legislation and patent practice, the computer-readable medium does not include an electric carrier signal and a telecommunication signal.

the foregoing embodiments are merely used for describing the technical solutions of this application, but does not limit this application. Although this application is described in detail with reference to the foregoing embodiments, a person of ordinary skill in the art should understand that, modifications may still be made to the technical solutions in the foregoing embodiments, or equivalent replacements may be made to some technical features in the technical solutions, and such modifications or replacements do not cause the essence of corresponding technical solutions to depart from the spirit and scope of the technical solutions of the embodiments of this application, which shall fall within the protection scope of this application.

What is claimed is:

1. A method for image matting, comprising:
obtaining a first image comprising a foreground, a second image comprising a background, and soft segmentation of the foreground; and
inputting the first image, the second image, and the soft segmentation into an image matting network, and outputting a foreground segmentation of the first image, wherein
the image matting network comprises at least one stage network, wherein the at least one stage network comprises a context combining module, a stem block, and a predictor module, the first image, the second image, and the soft segmentation of the foreground are inputted into the context combining module, the context combining module is configured to output a low-order feature and a high-order feature after feature exchange, the stem block is configured to fuse the low-order feature and the high-order feature based on an attention mechanism to obtain a fused feature, and the predictor module is configured to output the foreground segmentation according to the fused feature.

2. The method according to claim 1, wherein the image matting network is trained by:
obtaining a training sample set and an initial network; and
training the initial network by using the training sample set to obtain the image matting network; wherein
the training sample set comprises a plurality of training samples, each of the training samples comprises an input image sample, the input image sample comprises a first image sample having a foreground, a second image sample having a background, and a soft segmentation sample of the foreground, and the soft segmentation sample is generated by subtracting a second depth image corresponding to the second image sample from a first depth image corresponding to the first image sample, and
the initial network comprises the at least one stage network, wherein the at least one stage network comprises the context combining module, the stem block, and the predictor module, the input image sample is inputted into the context combining module, the context combining module is configured to output the low-order feature and the high-order feature after the feature exchange, the stem block is configured to fuse the low-order feature and the high-order feature based on the attention mechanism to obtain the fused feature, and the predictor module is configured to output a predicted foreground segmentation according to the fused feature.

3. The method according to claim 2, wherein
each of the training samples comprises the input image sample and a label of the input image sample; and
the training the initial network by using the training sample set to obtain the image matting network comprises:
performing supervised training on the initial network by using the training sample set, to obtain the image matting network.

4. The method according to claim 2, wherein
the training sample set comprises a plurality of labeled training samples and a plurality of unlabeled training samples, each of the labeled training samples comprises the input image sample and a label of the input image sample, and each of the unlabeled training samples comprises the input image sample; and
the training the initial network by using the training sample set to obtain the image matting network comprises:
performing supervised training on the initial network by using the labeled training samples, and performing unsupervised knowledge distillation by using the unlabeled training samples, to obtain the image matting network.

5. The method according to claim 2, wherein the at least one stage network comprises a plurality of stage networks; and the input image sample is inputted to a first stage network of the plurality of stage networks, and the first image sample, the second image sample, and a predicted foreground segmentation outputted by the first stage network are inputted to a next stage network of the plurality of stage networks.

6. The method according to claim 2, wherein the at least one stage network is configured to perform three downsamplings.

7. The method according to claim 2, wherein the initial network is trained with a hybrid loss function, and the hybrid loss function comprises a mean square error loss, a structural similarity loss, or an intersection over union loss.

8. An electronic device, comprising a memory, a processor, and a computer program stored in the memory and executable on the processor, wherein when executing the computer program, the processor performs operations comprising:
obtaining a first image comprising a foreground, a second image comprising a background, and soft segmentation of the foreground; and
inputting the first image, the second image, and the soft segmentation into an image matting network, and outputting a foreground segmentation of the first image, wherein
the image matting network comprises at least one stage network, wherein the at least one stage network comprises a context combining module, a stem block, and a predictor module, the first image, the second image, and the soft segmentation of the foreground are inputted into the context combining module, the context combining module is configured to output a low-order feature and a high-order feature after feature exchange, the stem block is configured to fuse the low-order feature and the high-order feature based on an attention mechanism to obtain a fused feature, and the predictor module is configured to output the foreground segmentation according to the fused feature.

9. The electronic device according to claim 8, wherein the image matting network is trained by:
obtaining a training sample set and an initial network; and
training the initial network by using the training sample set to obtain the image matting network; wherein
the training sample set comprises a plurality of training samples, each of the training samples comprises an input image sample, the input image sample comprises a first image sample having a foreground, a second image sample having a background, and a soft segmentation sample of the foreground, and the soft segmentation sample is generated by subtracting a second depth image corresponding to the second image sample from a first depth image corresponding to the first image sample, and
the initial network comprises the at least one stage network, wherein the at least one stage network comprises the context combining module, the stem block, and the predictor module, the input image sample is inputted into the context combining module, the context combining module is configured to output the low-order feature and the high-order feature after the feature exchange, the stem block is configured to fuse the low-order feature and the high-order feature based on the attention mechanism to obtain the fused feature, and the predictor module is configured to output a predicted foreground segmentation according to the fused feature.

10. The electronic device according to claim 9, wherein each of the training samples comprises the input image sample and a label of the input image sample; and the training the initial network by using the training sample set to obtain the image matting network comprises:
performing supervised training on the initial network by using the training sample set, to obtain the image matting network.

11. The electronic device according to claim 9, wherein the training sample set comprises a plurality of labeled training samples and a plurality of unlabeled training samples, each of the labeled training sample comprises the input image sample and a label of the input image sample, and each of the unlabeled training sample comprises the input image sample; and the training the initial network by using the training sample set to obtain the image matting network comprises:
performing supervised training on the initial network by using the labeled training samples, and performing unsupervised knowledge distillation by using the unlabeled training samples, to obtain the image matting network.

12. The electronic device according to claim 9, wherein the at least one stage network comprises a plurality of stage networks; and the input image sample is inputted to a first stage network of the plurality of stage networks, and the first image sample, the second image sample, and a predicted foreground segmentation outputted by the first stage network are inputted to a next stage network of the plurality of stage networks.

13. The electronic device according to claim 9, wherein the at least one stage network is configured to perform three downsamplings.

14. The electronic device according to claim 9, wherein the initial network is trained with a hybrid loss function, and the hybrid loss function comprises a mean square error loss, a structural similarity loss, or an intersection over union loss.

15. A non-transitory computer storage medium storing a computer program, wherein the computer program, when executed by a processor, causes the processor to perform operations comprising:

obtaining a first image comprising a foreground, a second image comprising a background, and soft segmentation of the foreground; and inputting the first image, the second image, and the soft segmentation into an image matting network, and outputting a foreground segmentation of the first image, wherein the image matting network comprises at least one stage network, wherein the at least one stage network comprises a context combining module, a stem block, and a predictor module, the first image, the second image, and the soft segmentation of the foreground are inputted into the context combining module, the context combining module is configured to output a low-order feature and a high-order feature after feature exchange, the stem block is configured to fuse the low-order feature and the high-order feature based on an attention mechanism to obtain a fused feature, and the predictor module is configured to output the foreground segmentation according to the fused feature.

16. The medium according to claim 15, wherein the image matting network is trained by:

obtaining a training sample set and an initial network; and training the initial network by using the training sample set to obtain the image matting network; wherein the training sample set comprises a plurality of training samples, each of the training samples comprises an input image sample, the input image sample comprises a first image sample having a foreground, a second image sample having a background, and a soft segmentation sample of the foreground, and the soft segmentation sample is generated by subtracting a second depth image corresponding to the second image sample from a first depth image corresponding to the first image sample, and the initial network comprises the at least one stage network, wherein the at least one stage network comprises the context combining module, the stem block, and the predictor module, the input image sample is inputted into the context combining module, the context combining module is configured to output the low-order feature and the high-order feature after the feature exchange, the stem block is configured to fuse the low-order feature and the high-order feature based on the attention mechanism to obtain the fused feature, and the predictor module is configured to output a predicted foreground segmentation according to the fused feature.

17. The medium according to claim 16, wherein each of the training samples comprises the input image sample and a label of the input image sample; and the training the initial network by using the training sample set to obtain the image matting network comprises:
performing supervised training on the initial network by using the training sample set, to obtain the image matting network.

18. The medium according to claim 16, wherein the training sample set comprises a plurality of labeled training samples and a plurality of unlabeled training samples, each of the labeled training sample comprises the input image sample and a label of the input image sample, and each of the unlabeled training sample comprises the input image sample; and the training the initial network by using the training sample set to obtain the image matting network comprises:
performing supervised training on the initial network by using the labeled training samples, and performing unsupervised knowledge distillation by using the unlabeled training samples, to obtain the image matting network.

19. The medium according to claim 16, wherein the at least one stage network comprises a plurality of stage networks; and the input image sample is inputted to a first stage network of the plurality of stage networks, and the first image sample, the second image sample, and a predicted foreground segmentation outputted by the first stage network are inputted to a next stage network of the plurality of stage networks.

20. The medium according to claim 16, wherein the initial network is trained with a hybrid loss function, and the hybrid loss function comprises a mean square error loss, a structural similarity loss, or an intersection over union loss.

\* \* \* \* \*